No. 788,717.

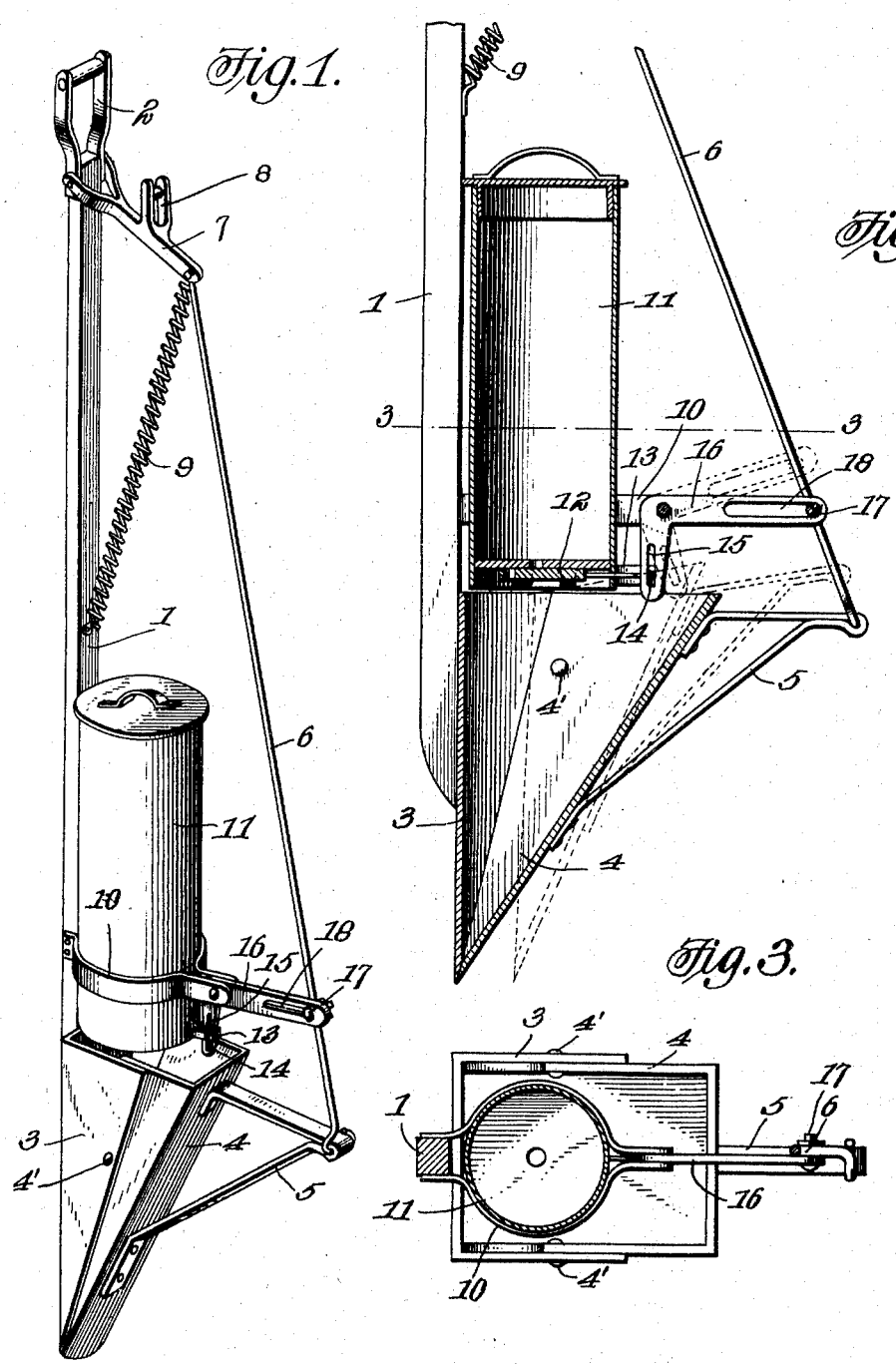

Patented May 2, 1905.

UNITED STATES PATENT OFFICE.

WALTER V. HART, OF VALPARAISO, INDIANA.

PLANTER.

SPECIFICATION forming part of Letters Patent No. 788,717, dated May 2, 1905.

Application filed July 28, 1904. Serial No. 218,533.

*To all whom it may concern:*

Be it known that I, WALTER V. HART, a citizen of the United States, residing at Valparaiso, in the county of Porter and State of Indiana, have invented certain new and useful Improvements in Planters; and I do declare the following to be a full, clear, and exact description of the invention, such as will enable others skilled in the art to which it appertains to make and use the same.

This invention relates to a planting device which may be employed for dropping seed or setting out plants and which aims to provide a simple and effective device of this character which is interchangeable for these purposes.

In the accompanying drawings, Figure 1 is a perspective view of the device embodying my invention. Fig. 2 is a vertical longitudinal section of the same, and Fig. 3 is a vertical cross-section through the device on the line 3 3 of Fig. 2.

In carrying my invention into practice I provide a handle-bar 1, which is provided at one end with any preferred form of hand-grip 2. At its opposite end the handle-bar carries jaws 3 and 4, each consisting of a substantially triangular piece of sheet metal open at one side and at its base or inner end, the open sides of the two jaws being arranged to face one another to provide a wedge-shaped shovel or digger adapted to be forced, under thrusts on the handle 1, into the ground. As shown, the jaws are pivotally connected at a point about intermediate of their length by rivets 4', so as to adapt the point ends thereof to be opened and closed. The jaw 3 is fixed to the handle-bar 1, while the jaw 4 is pivotally connected by the rivets 4' to the jaw 3.

The inner or upper ends of the jaws may be left open or covered by some suitable flexible material to expand and contract bellows-like to compensate for the movement of the jaw 4 upon the jaw 3. The jaw 4 has attached thereto a bracket 5, which is connected by a rod 6 to an angular lever 7, pivoted to the handle-bar 1 adjacent to the hand-grip 2, said lever being provided with a handle 8, which is adapted to be forced toward the said grip 2 to draw upon the rod 6, and thereby swing the jaw 4 to its open position. The spring 9 connects said lever 7 with the handle-bar 1 and serves to restore the parts to their normal position.

Secured to the handle-bar 1 in rear of the jaws 3 and 4 is a bracket in the form of a strap-loop 10 to serve as a support for a removable hopper 11, adapted to contain corn, potatoes, or other seed to be dropped. The outer end of this hopper enters the inner open base portion of the jaws 3 and 4 and is provided at that end with a sliding dropper 12, having an exteriorly-projecting arm 13, carrying a pin 14, which plays in a slot 15 in one arm of a bell-crank lever 16, the other arm of which is pivotally connected to the rod 6 by a pin 17 upon the rod which enters and plays within a slot 18 in the said arm of said lever. By this construction it will be seen that when the handle 8 of the lever 7 is actuated the jaw 4 and the dropper 12 will be simultaneously opened to drop seed.

In the operation of the device the jaws 3 and 4 are first forced into the ground and the lever 7 then operated to force out one charge of seed and open the jaw 4 to deposit the same. When it is desired to set out plants, the hopper 11 is removed, together with the lever 16, the plant placed within the jaws 3 and 4, the latter forced into the ground, and the jaw 4 then opened to deposit the plant, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

A device of the character described comprising a handle-bar, a fixed jaw carried by said bar, a movable jaw pivoted to the fixed jaw, said jaws forming a pointed receptacle, a hopper arranged to discharge into said receptacle and containing a dropping device, a pivoted handle for simultaneously operating the movable jaw and dropping device, and a spring for closing the movable jaw, and closing the dropping device, said spring being connected to a pivoted handle and to the handle-bar, substantially as described.

In testimony whereof I have hereunto set my hand in presence of two subscribing witnesses.

WALTER V. HART.

Witnesses:
WALTER G. BLACK,
FRANK B. PARKS.